(No Model.)
J. S. SHERMAN.
FOCAL CENTER OPTOMETER.
No. 484,055. Patented Oct. 11, 1892.
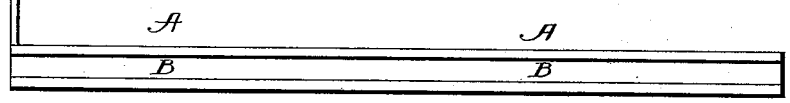
Fig. 1.
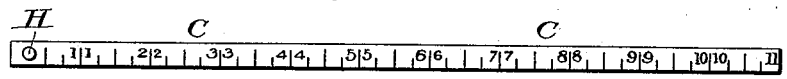
Fig. 2.
Fig. 3.
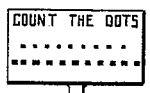
Fig. 4.       Fig. 5.
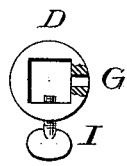 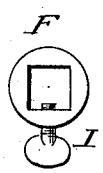
Fig. 6.
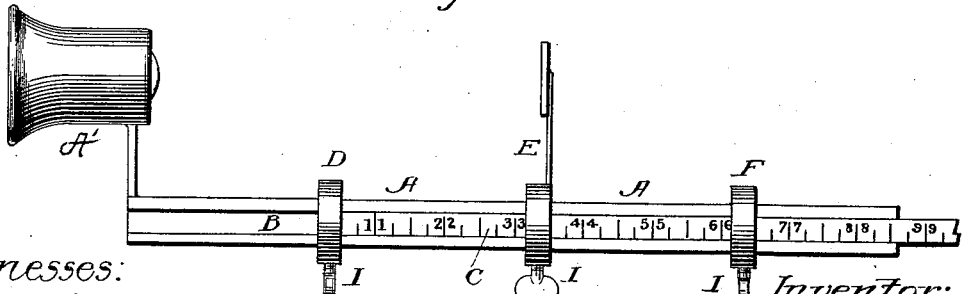
Witnesses:
Milroy J. Miller
Edward H. Trowbridge
Inventor:
Jacob Silver Sherman

UNITED STATES PATENT OFFICE.

JACOB SILVER SHERMAN, OF CASSOPOLIS, MICHIGAN.

FOCAL-CENTER OPTOMETER.

SPECIFICATION forming part of Letters Patent No. 484,055, dated October 11, 1892.

Application filed November 14, 1891. Serial No. 411,960. (No model.)

*To all whom it may concern:*

Be it known that I, JACOB SILVER SHERMAN, a citizen of the United States, residing at Cassopolis, in the county of Cass and State of Michigan, have invented a new and useful instrument, which I desire to be known as "the Focal-Center Optometer," of which the following is a specification.

My invention relates to improvements in optometers in which a movable test design is used for the purpose of determining the power of lens necessary to remedy certain defects in the vision of the eye.

Heretofore optometers have been used for the purpose of attaining the focus of the eye without reference to the limits of said focus, which while seemingly correct, in theory, the ordinary optometer is of limited value in practice on account of the length of space over which the focus of the eye extends. The flexibility of the lens of the eye and the eyeball together with the involuntary action of the orbital and ciliary muscles on the eye, gives to it the power of adjusting the focus of its lens to any point within a certain limited space. The attaining of the limits of said space and from them determining the focal center is the point which this instrument does accomplish, the object being to furnish to opticians, oculists, and dealers in optical goods generally an instrument with which the center of the focus of the eye can be easily and accurately determined.

In the accompanying drawings, Figure 1, is shown an ordinary optometer provided with lens-holder A', the test design E, Fig. 3, removed, and also with a slot B in the arm A, which extends the full length thereof, the adjustable measure C, Fig. 2, being made to fit in the slot B, Fig. 1, the adjustable collar D, Fig. 4, having the hole G, in which the pin H, Fig. 2, at the end of the measure C, Fig. 2, is adjusted, so that when the collar D, Fig. 4, is moved on the arm A, Fig. 1, the measure C, Fig. 2, moves with it, the collar D, Fig. 4, being placed on the arm A, Fig. 1, next to the eye-piece and between the eye-piece and the test design E, Fig. 3, the adjustable collar F, Fig. 5, being placed on the arm A, Fig. 1, between the test design E, Fig. 3, and the end of the arm A, Fig. 1, opposite the eye-piece, I I I being set screws, the measure C, Fig. 2, passing freely through the test design E, Fig. 3, and the collar F, Fig. 5, in the slot B, Fig. 1, when all are adjusted to their proper places, as shown in Fig. 6.

The instrument is operated in the following manner: Placing the eye-piece to the eye, holding the arm of the instrument horizontally, the test design E, Fig. 3, together with the collar D, Fig. 4, are moved toward the eye until distinct vision ceases and a blur is observed, at which point the collar D, Fig. 4, is made fast by the set-screw I. Then the test design E, Fig. 3, and the collar F, Fig. 5, are together moved from the eye, passing the point of distinct vision, to the opposite end of the arm A, Fig. 1, until distinct vision again ceases and the same degree of blur is obtained, at which point the collar F is made fast by screw I. Then by determining the center between the collar D, Fig. 4, and the collar F, Fig. 5, by means of test design E and the measure C, Fig. 2, the attaining of the focal center of the eye is accomplished.

It is evident that two arms and two lens-holders or eye-pieces may be attached together, and with a slight difference in the arrangement of parts heretofore described the same object will be attained.

In cases where the patient may desire lenses for far-seeing, the lens which is best suited can be easily determined from the point which is indicated by the center of the focus.

Other means may be used to attain and locate the focal limits of the eye. Hence I do not wish to confine my discovery and invention strictly to the manner herein detailed; but desire that Letters Patent may cover any device which comes clearly within the spirit and scope of my discovery and invention.

Having thus described all that is necessary to a full understanding of my discovery and invention, what I claim as new is—

1. In an optometer, the combination of a lens-holder A', an arm A, an adjustable measure, collars D and F, and adjustable design E, as and for the purposes set forth.

2. In an optometer, a slotted arm A, provided with an adjustable measure, in combination with a lens-holder, movable collars, adjustable design E, and set-screws to retain the collars and design E in fixed positions after adjustment, substantially as described and set forth.

3. The combination, in an optometer, of a lens-holder A', arm A, test design adjustable on arm A, an adjustable measure C, collar D, provided with an aperture G, collar F, and set-screws on said collars and design, substantially as described and set forth.

JACOB SILVER SHERMAN.

Witnesses:
JOHN L. YOST,
A. M. MOON,
JOEL COWGILL.